United States Patent [19]

Omiya

[11] Patent Number: 5,486,887
[45] Date of Patent: Jan. 23, 1996

[54] PHOTOGRAPHIC CAMERA WITH STROBE

[75] Inventor: Akio Omiya, Saitama, Japan

[73] Assignee: Fuji Photo Optical Co., Ltd., Ohmiya, Japan

[21] Appl. No.: 305,315

[22] Filed: Sep. 15, 1994

[30] Foreign Application Priority Data

Oct. 14, 1993 [JP] Japan .................. 5-256782

[51] Int. Cl.$^6$ .............. G03B 15/03; G03B 17/02
[52] U.S. Cl. ...................... 354/149.11; 354/288
[58] Field of Search ............... 354/145.1, 149.1, 354/149.11, 288, 287, 461, 126

[56] References Cited

U.S. PATENT DOCUMENTS

| | | | |
|---|---|---|---|
| 4,317,628 | 3/1982 | Shimizu | 354/288 |
| 4,771,303 | 9/1988 | Matsumoto et al. | 354/195.12 |
| 4,827,296 | 5/1989 | Haraguchi et al. | 354/187 |
| 5,001,505 | 3/1991 | Tosaka et al. | 354/173.1 |
| 5,155,514 | 10/1992 | Tamamura | 354/174 |
| 5,258,794 | 11/1993 | Woltz et al. | 354/275 |
| 5,394,214 | 2/1995 | Petruchik | 354/288 |

FOREIGN PATENT DOCUMENTS 4-289834  10/1992  Japan .

*Primary Examiner*—Michael L. Gellner
*Assistant Examiner*—Nicholas J. Tuccillo
*Attorney, Agent, or Firm*—Fish & Richardson

[57] ABSTRACT

A photographic camera has a film magazine chamber, a film-take-up spool chamber, an optical system disposed between the film magazine chamber and the film-take-up spool chamber and a strobe energized by a strobe driving circuit. The strobe driving circuit includes a plurality of capacitors for accumulating charge from a power source and the capacitors are disposed in a space between the optical system and at least one of the film magazine chamber and the film-take-up spool chamber in positions where the capacitors do not interfere with a light bundle entering the optical system and emanating therefrom.

4 Claims, 2 Drawing Sheets

PHOTOGRAPHIC CAMERA WITH STROBE

BACKGROUND OF THE INVENTION

1. Field of the Invention

This invention relates to a photographic camera with a strobe in which positioning of a main capacitor for the strobe is improved.

2. Description of the Prior Art

There is an increasing demand for reducing the size of a photographic camera and various miniature cameras have been put into practical use. Though there has been known a very small camera in which a special small size film is used, resolving power deteriorates as the size of film is reduced and sharp photography cannot be obtained. Accordingly, the development of miniature camera which is as small as possible in size and in which uses a normal 35 mm film magazine is desirable.

Further a camera with a strobe which makes it feasible to take a picture in the dark has been developed and miniaturization of the camera with strobe is progressing. Since a large amount of power is necessary at one time to energize the strobe, the camera with strobe requires a main capacitor having a large capacity for accumulating charge from a power source. Generally the capacitor is cylindrical in shape and the diameter and/or the length of the capacitor increases as the capacity thereof increases. Accordingly the large capacity main capacitor obstructs miniaturization of the camera with strobe.

Thus in some cameras, the strobe driving circuit includes two or more capacitors which are arranged in the direction of thickness of the camera on the outer side of a film magazine chamber or on the outer side of a film-take-up spool chamber as shown in FIGS. 4A and 4B, where reference numerals 2, 3, 7, 10A and 10B respectively denote the film magazine chamber, the film-take-up spool chamber, the strobe and the capacitors. Since the diameter of each of the capacitors 10A and 10B can be smaller than that of a single capacitor having the capacity equal to the sum of the capacities of the two capacitors 10A and 10B, the width of the camera can be reduced with this arrangement as compared with the camera having a single capacitor for the strobe disposed on the outer side of the film magazine chamber or the film-take-up spool chamber.

However, even in the two capacitor camera, the space for the capacitors cannot be nullified and limits further miniaturization of the camera.

SUMMARY OF THE INVENTION

In view of the foregoing observations and description, an object of the present invention is to provide a structure of a camera with strobe which permits further miniaturization of the camera without reducing the capacity of the capacitor for the strobe.

The photographic camera in accordance with the present invention has a film magazine chamber, a film-take-up spool chamber, a taking optical system disposed between the film magazine chamber and the film-take-up spool chamber and a strobe energized by a strobe driving circuit. The strobe driving circuit includes a plurality of capacitors for accumulating charge from a power source and the capacitors are disposed in a space between the taking optical system and each of the film magazine chamber and the film-take-up spool chamber in positions where the capacitors do not interfere with a light bundle entering the taking optical system and emanating therefrom.

With this arrangement, the freedom in designing the camera is increased and the width of the camera can be reduced as compared with the camera shown in FIG. 4A or 4B where the capacitors are arranged in the direction of thickness of the camera on the outer side of the film magazine chamber or on the outer side of the film-take-up spool chamber. Further by properly selecting the diameters and the lengths of the capacitors, the total capacity of the capacitors can be freely adjusted, and as compared with the case where the strobe driving circuit includes a single large capacitor, layout of the spaces for the capacitors is facilitated and the freedom in designing the camera is increased.

When the present invention is applied to a so-called "drop-in-load" type camera in which film can be loaded by simply dropping a film magazine, the distance between the film magazine chamber and the film-take-up spool chamber can be kept proper to load a film magazine by the drop-in-load system without adjusting the length of the leader portion of the film though the width of the camera body is reduced.

DESCRIPTION OF THE PREFERRED EMBODIMENTS

Figure 1:
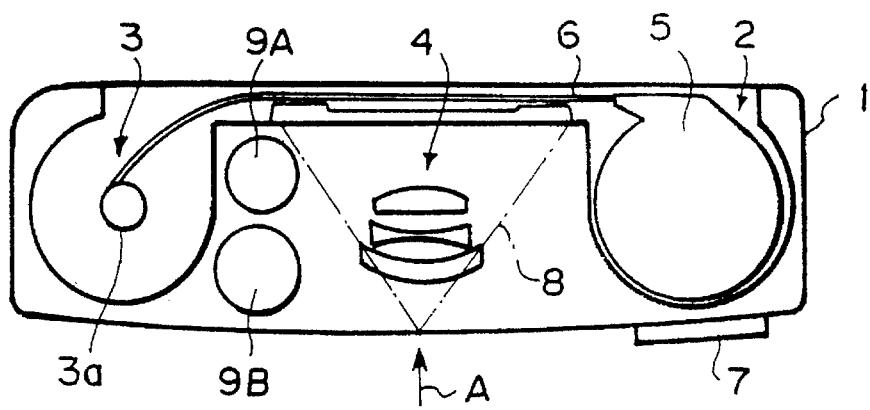
FIG. 1 is a schematic view showing a photographic camera with strobe in accordance with a first embodiment of the present invention.

In FIG. 1, a photographic camera with strobe in accordance with a first embodiment of the present invention comprises a camera body 1 provided therein a film magazine chamber 2 in which a film magazine 5 is loaded, a film-take-up spool chamber 3 in which a take-up spool 3a is positioned, and a taking optical system 4 comprising a plurality of lens elements for focusing light from an object entering the lenses in the direction of arrow A. A strobe 7 is mounted on the front face of the camera body 1. Reference numeral 6 denotes a film drawn out from the film magazine 5 and reference numeral 8 denotes a light bundle which enters the taking optical system 4 and emanates therefrom to impinge upon the film 6. A pair of capacitors 9A and 9B having different diameters are disposed in a space between the taking optical system 4 and the film-take-up spool chamber 3 in positions where the capacitors 9A and 9B do not interfere with the light bundle 8. The capacitors 9A and 9B are connected to a power source (not shown) and the strobe 7 through a driving circuit (not shown). Charges of predetermined values from the power source are accumulated in the respective capacitors 9A and 9B and the strobe 7 is energized by the accumulated charges in the capacitors 9A and 9B. The diameters of the capacitors 9A and 9B may be equal to each other.

Since the capacitors 9A and 9B are disposed between the taking optical system 4 and the film-take-up spool chamber 3 in this embodiment, the camera body 1 need not be provided with a space for a capacitor or capacitors on the outer side of the film-take-up spool chamber 3 or the film magazine chamber 2 and accordingly the width of the camera body 1 can be reduced. Further, in this embodiment, since the driving circuit has a pair of capacitors 9A and 9B and the capacities required for energizing the strobe 7 is provided by both the capacitors 9A and 9B, each of the capacitors 9A and 9B may have a diameter much smaller than that of a single capacitor which provides the capacities required for energizing the strobe 7 by itself, which facilitates miniaturization of the camera without reducing the capacity for the strobe. The sizes of the capacitors 9A and 9B may be freely set provided that they do not interfere with the light bundle 8, whereby the capacities of the capacitors 9A and 9B can be freely adjusted. Further since in accordance with this embodiment, the camera body can be miniaturized without reducing the distance between the film magazine chamber 2 and the film-take-up spool chamber 3, even if the camera is of a so-called "drop-in-load" type camera in which film can be loaded by simply dropping a film magazine, the film magazine can be loaded therein without adjusting the length of the leader portion of the film 6.

Figure 2:
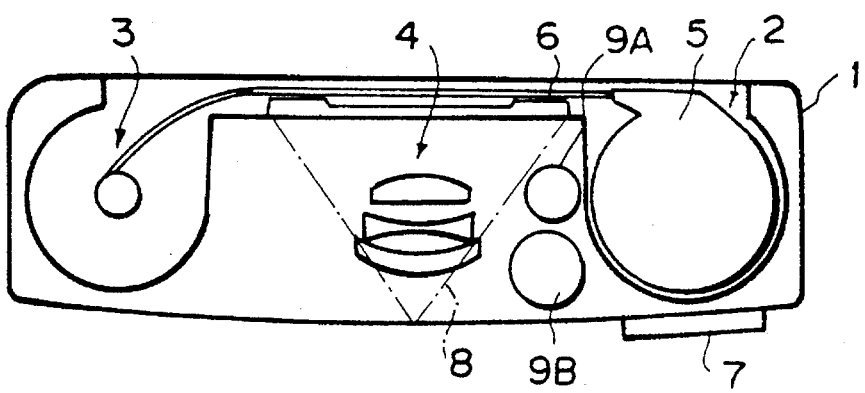
FIG. 2 is a schematic view showing a photographic camera with strobe in accordance with a second embodiment of the present invention.
Figure 3:
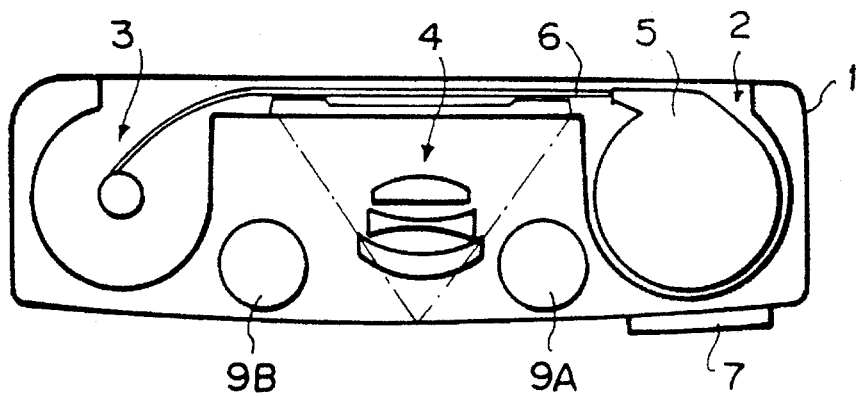
FIG. 3 is a schematic view showing a photographic camera with strobe in accordance with a third embodiment of the present invention.
Figure 4A:
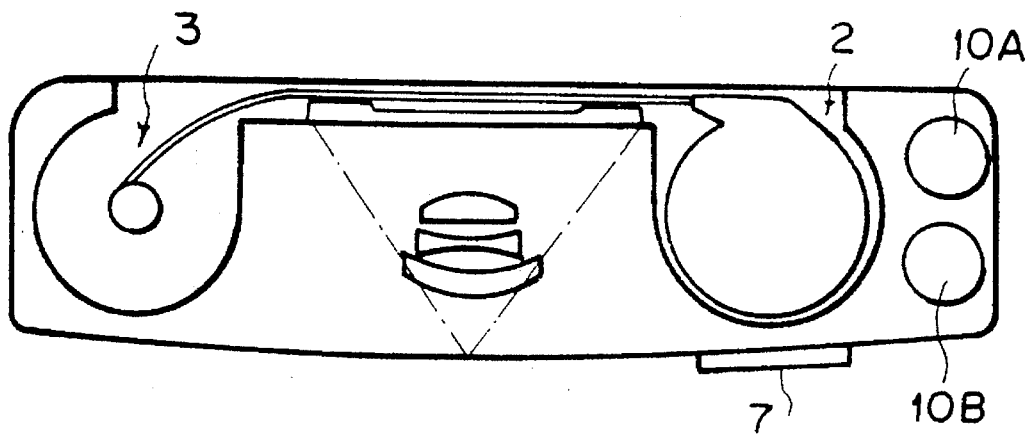
FIGS. 4A and 4B are schematic views showing examples of conventional photographic cameras with strobe.
Figure 4B:
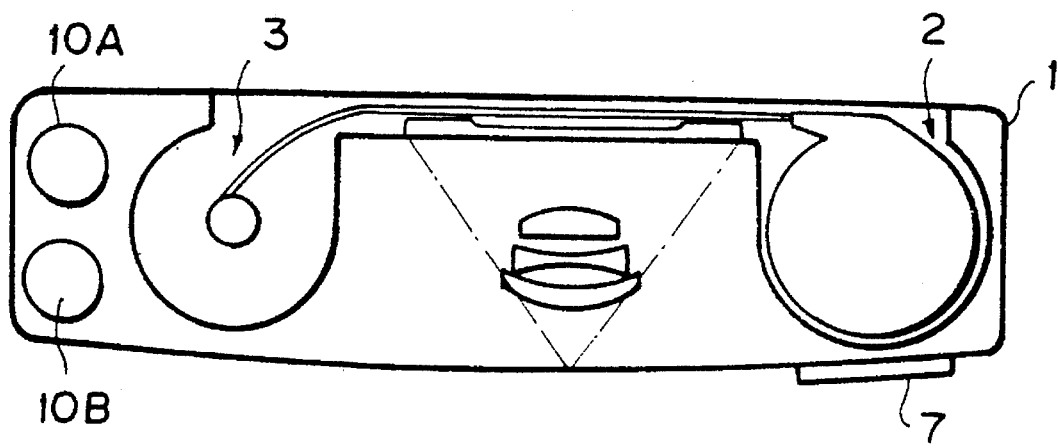

The capacitors 9A and 9B may be disposed in a space between the taking optical system 4 and the film magazine chamber 2 in positions where the capacitors 9A and 9B do not interfere with the light bundle 8 as shown in FIG. 2. Further the capacitors 9A and 9B may be disposed one in the space between the taking optical system 4 and the film magazine chamber 2 and the other in the space between the taking optical system 4 and the film-take-up spool chamber 3 as shown in FIG. 3.

The strobe driving circuit may have more than two capacitors which may be disposed either in one of the spaces between the taking optical system 4 and the film magazine chamber 2 and between the taking optical system 4 and the film-take-up spool chamber 3 or in both of them, which further increases the degree of freedom in designing the camera.

What is claimed is;

1. A photographic camera comprising a film magazine chamber, a film-take-up spool chamber, an optical system disposed between the film magazine chamber and the film-take-up spool chamber and a strobe energized by a strobe driving circuit, wherein the strobe driving circuit includes a plurality of capacitors for accumulating charge from a power source, said plurality of capacitors being disposed in a space between the optical system and at least one of the film magazine chamber and the film-take-up spool chamber such that the capacitors do not interfere with a light bundle entering the optical system and emanating therefrom.

2. A photographic camera as defined in claim 1 in which said capacitors differ from each other in size.

3. A photographic camera as defined in claim 1, in which said plurality of capacitors is disposed both (i) in the spaces between the optical system and the film magazine chamber, and (ii) between the optical system and the film-take-up spool chamber.

4. A photographic camera as defined in claim 1, wherein said camera comprises a drop-in-load type camera in which film can be loaded by placing a film magazine into the film magazine chamber.

\* \* \* \* \*